June 8, 1954 H. E. MICHAEL 2,680,346
JET ENGINE INLET DUCT COUPLING
Filed Sept. 10, 1951 2 Sheets-Sheet 1

INVENTOR:
Harold E. Michael
By Herbert E. Metcalf
His Patent Attorney

June 8, 1954     H. E. MICHAEL     2,680,346
JET ENGINE INLET DUCT COUPLING
Filed Sept. 10, 1951     2 Sheets-Sheet 2
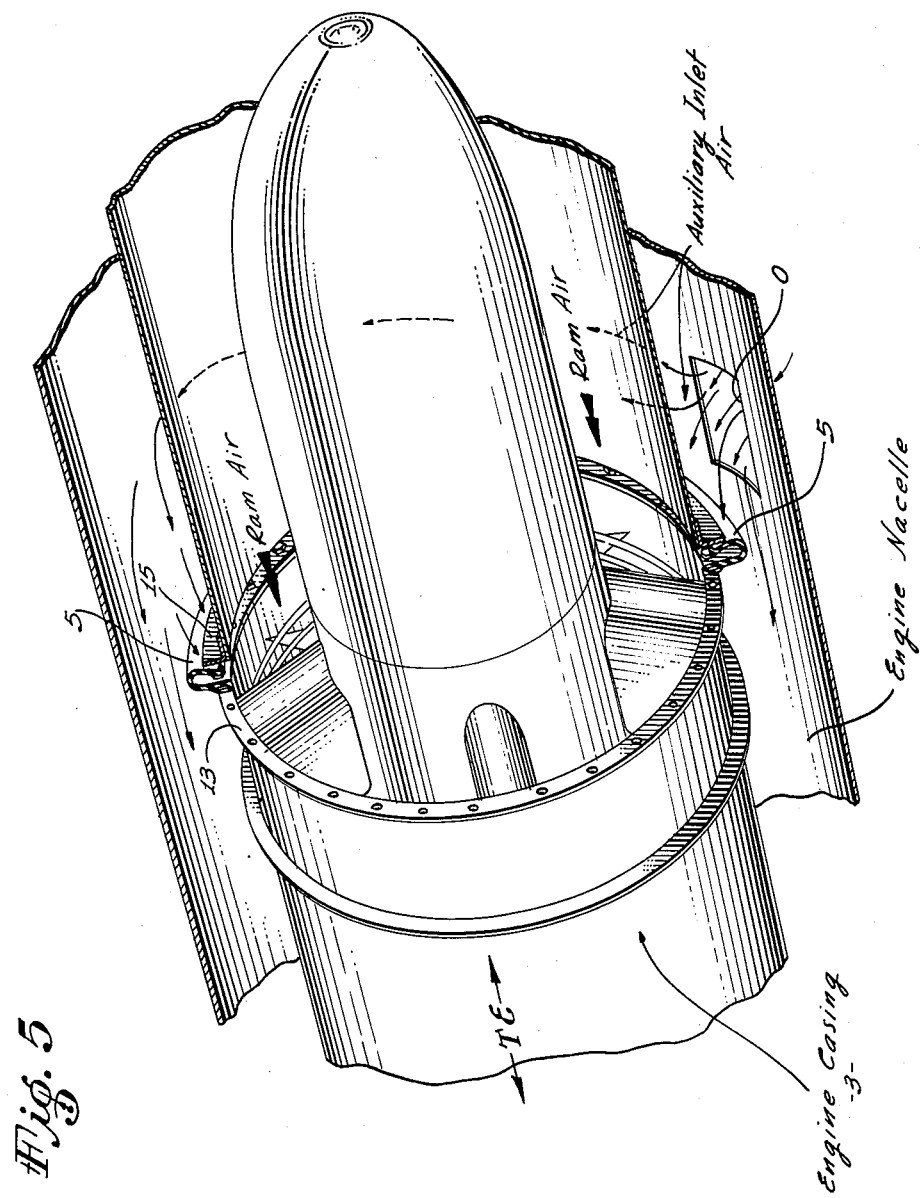
INVENTOR:
Harold E. Michael
By Herbert E. Metcalf
His Patent Attorney Patented June 8, 1954

2,680,346

UNITED STATES PATENT OFFICE 2,680,346

JET ENGINE INLET DUCT COUPLING

Harold E. Michael, Hawthorne, Calif., assignor to Northrop Aircraft, Inc., Hawthorne, Calif., a corporation of California Application September 10, 1951, Serial No. 245,859

6 Claims. (Cl. 60—39.32)

My invention relates to flexible couplings for ducts and more particularly to means for sealing and closing the space between the forward end of a jet engine casing and the air inlet section of the engine nacelle or other portion of the airframe.

As is generally known, a modern jet engine when being started and warmed up, will "grow" or increase in length due to ordinary thermal expansion until, by the time the engine is hot enough to operate efficiently, it will have increased substantially in overall length with the expansion from the main engine mount to the forward end of the engine enclosure varying from one-quarter inch to as much as one-half inch in certain cases. The forward coupling, therefore, must be sufficiently flexible in construction and manner of installation to compensate for a longitudinal expansion-contraction range of at least one-half inch, plus a reasonable margin for safety.

Furthermore, to provide for proper weight distribution and solid attachment to the airframe, the main engine mount is usually located considerably aft of the front of the engine enclosure. Thus an inconsequential change in the adjustment of the attachment fittings will cause only a slight variation in engine position at the mounting point, but this variation—increased many fold when transmitted to the forward coupling point—becomes an important dimensional consideration, necessitating the use of coupling means having large tolerance for variations in the relative lateral placement of the adjacent components.

The problems of engine growth and relative lateral movement between associated parts are only two out of many considerations involved in airtight duct coupling installations of this type. Other difficulties commonly encountered are mentioned or implied in the following summary of the objects of this invention.

Among the objects of this invention is to provide completely satisfactory duct coupling and sealing means fulfilling a number of secondary objective requirements, namely: (1) to offset or compensate for changes in longitudinal dimensions due to thermal expansion of the engine while operating at high temperatures, and (2) to permit lateral variations in engine alignment at time of installation, as well as (3) to compensate for minor displacements and relative movement in all directions; (4) to maintain an airtight closure under widely divergent conditions of unequal internal and external air pressures, (5) to be self-sealing and completely automatic in operation, (6) to be easily installed without the use of special tools, and finally (7) to be capable of performing the aforementioned functions without transmitting engine weight loads and the strains of longitudinal and lateral engine movements to the airplane itself.

Stated briefly, one form of my invention includes an annular, flexible coupling flange, U shaped in cross section with substantially parallel sidewalls extending inwardly, one sidewall being reinforced and suitably perforated for bolting to a mounting flange at forward end of the jet engine casing, the other sidewall being terminated in a reinforcing bead extending outwardly to make contact with a flat circular surface on the aft side of the rear bulkhead of the air inlet nacelle section.

When engine is cool and external air pressure is slightly positive, the contact bead of the coupling flange is free to move laterally across the circular vertical surface of the inlet section bulkhead seeking optimum positioning thereon and adjusting for changes in longitudinal alignment of the engine; but when engine is started and thermal expansion begins, the growth of the engine forward of the engine mount moves the coupling flange forward and presses the bead of the outer sidewall against the bulkhead surface at the point of most favorable engine alignment, where it is held even more firmly by the cooperating forces of ram air pressure, thereby maintaining an airtight closure in spite of variations in air pressure and relative movement in any direction during subsequent operaton of engine.

My invention can be most readily illustrated and explained by a description of its use and operation in one specific embodiment. So, for the purpose of this application, I have elected to describe its use as an airtight coupling means for jet engine air ducts, but it is to be distinctly understood that this limited presentation is made for illustrative and explanatory purposes only, and the citation of this single, typical example of my invention is not to be interpreted in any manner that might tend to restrict its complete and most comprehensive application within the full scope of the art and the broadest spirit of the appended claims.

In the accompanying drawings.

Figure 5 is a perspective view of the sealing arrangement with a portion of the nacelle and the inlet casing cut away.

Figure 1:
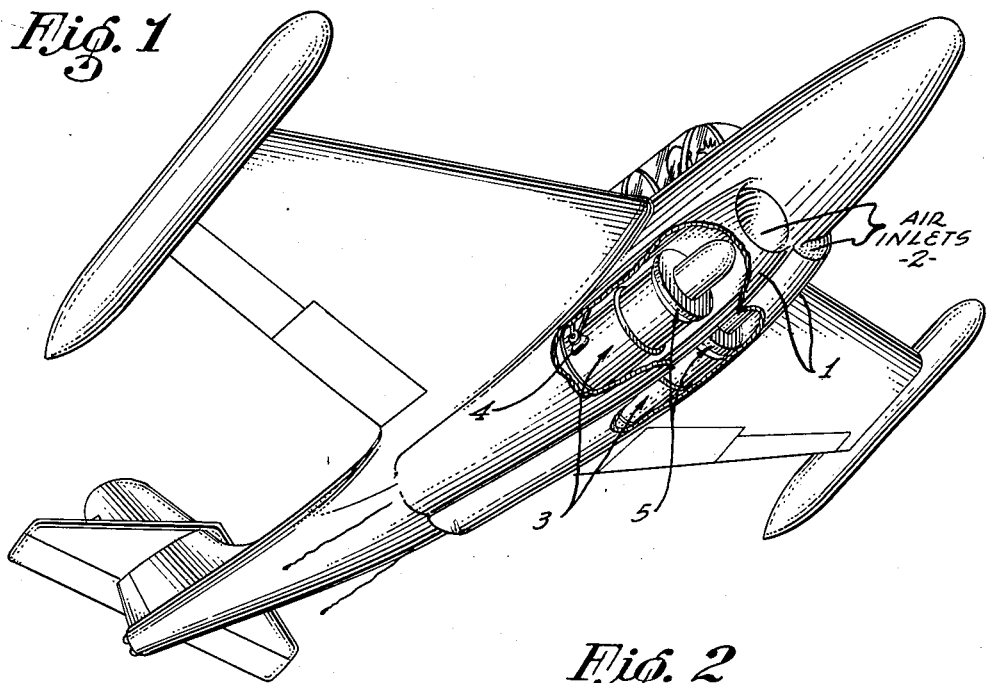
Figure 1 is a perspective diagrammatic view of a jet propelled airplane with sections of the engine nacelles cut away to show location of air inlet sections, jet engines and positioning of airtight coupling flanges.
Figure 2:
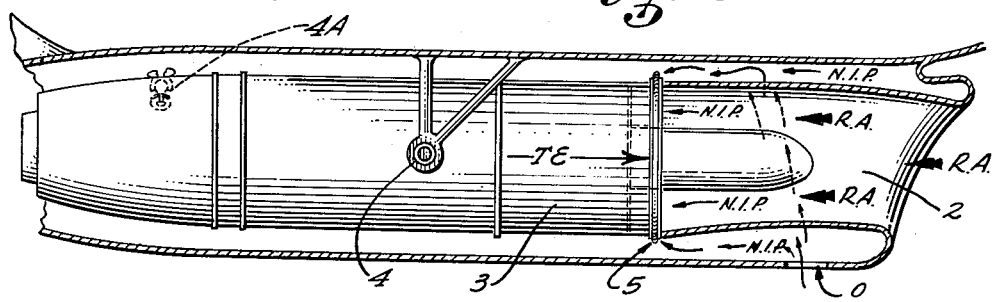
Figure 2 is a longitudinal sectional diagrammatic view of an engine nacelle with outer fairings removed, showing relative positions of air inlet area in nacelle nose section, engine enclosure, main and aft engine mounts, and airtight coupling flange.
Figure 3:
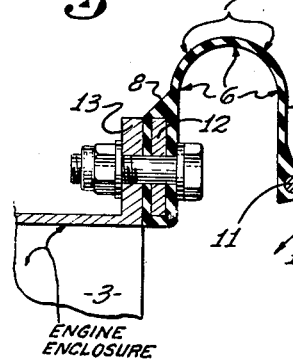
Figure 3 is a cross sectional view of coupling flange and mounting and contact rings when engine is cold.
Figure 4:
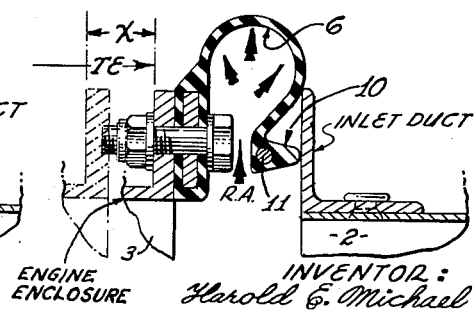
Figure 4 is a similar sectional view showing relative position of parts when engine is heated.

My invention, in this particular form, includes a flexible, circular, collar-like flange 5 as shown in Figures 1 and 2, having a generally U-shaped cross section 6 as shown in Figures 3, 4, and 5, including a crowned body portion 7 forming the center section of the flange at the point of largest outside circumference thereof, and two substantially parallel sidewalls 8 and 9 extending inwardly from said body portion 7 toward the horizontal axis of the flange, one sidewall being terminated in a V-shaped bead 10 positioned generally perpendicular to said sidewall and pointing outwardly.

Except for two metallic reinforcements, the entire coupling flange is fabricated preferably of laminated neoprene-impregnated fabric or the like and in outer and sectional contour resembles to some extent a conventional clincher type bicycle tire before application of the outer tread except that only one sidewall is terminated in an outwardly extending bead.

The other sidewall 8 is reinforced with a flat, washer-like metal ring 12, which is molded entirely within the fabric of the sidewall 8 and is perforated to align with bolt holes in mounting ring 13 affixed to the leading outer edge 14 of the engine enclosure 3.

When the reinforced sidewall 8 of the coupling flange is bolted to mounting ring 13 of engine enclosure 3 as indicated in Figure 3, the outwardly extending bead 10 on the other sidewall 9 extends forward adjacent to and parallel with a contact ring 15 having a flat, circular surface 16 around the aft opening of the air inlet, said bead 10 being reinforced with a continuous loop of metal cable 11 which prevents circumferential expansion of said bead and assures contact thereof with flat surface 16 of contact ring 15.

When engine is not operating and is cool, and internal and external air pressures are approximately equal, the point of the outwardly extending bead 10 will align with, but may not quite touch, said contact ring 15, or, depending upon the stiffness of the crowned section 7 of the flange, may make very light contact therewith. But when engine is started and accelerated, a negative internal air pressure, indicated by arrows NIP in Figures 2 and 3, is built up due to compressor suction. Thermal expansion and longitudinal growth of the engine, indicated by arrow TE, take place. In flight, ram air, signified by symbol RA, is admitted.

The negative pressure built up by compressor operation on the ground, will, when the engine is cool, pull in additional inlet air through nacelle opening O as indicated by arrows NIP, past the bead 10 as shown in Figure 3. However, as soon as ram pressure, due to flight, builds up in air inlet 2, this ram pressure inflates the concave interior 6 of the flange, and cooperates with compression force of thermal expansion TE in pressing the bead 10 firmly against the flat surface of the contact ring 16 and thereby, due to the compressibility and compensating flexibility of the flange with regard to relative movement in any direction, maintains an airtight seal throughout any sequence of variable pressure and subsequent movement while the engine is hot, and prevents loss of ram pressure in flight.

What is claimed is:

1. In an engine air ducting system for a jet propelled airplane having as components a jet engine and jet engine casing and an engine air inlet duct, a device for coupling said jet casing and said air inlet duct comprising an annular flexible flange, generally U-shaped in cross section with substantially parallel sides extending inwardly, one sidewall being reinforced and being joined to the forward end of said jet engine casing, the other sidewall being terminated in a reinforced bead extending outwardly toward a flat annular surface on a facing end of said inlet duct, said bead being out of contact with said flat annular surface when said engine is cold and in the absence of ram air, said outwardly extending bead being moved into contact with and pressed against said flat annular surface by the thermal expansion of the engine casing as said engine becomes hot, and held firmly thereagainst by said expansion force and by ram air pressure in said duct, thereby maintaining an air-tight closure between said casing and said duct.

2. In an engine air ducting system for a jet propelled airplane having as components an air inlet duct, a jet engine and a jet engine casing, a device for coupling said casing and said air inlet duct comprising an annular flexible and laterally compressible flange, generally U-shaped in cross section with substantially parallel sides extending inwardly, one sidewall being reinforced and being joined to the forward end of said jet engine casing, the other sidewall being terminated in a reinforced bead extending outwardly toward a flat annular surface on a facing end of said inlet duct, said bead being out of contact with said flat annular surface when said engine is cold to pass air to said engine from the exterior of said engine casing and inlet duct in the absence of ram air, said outwardly extending bead being moved into contact with and compressed against said flat annular surface of ducting component by the thermal expansion of the engine as said engine becomes hot, and held firmly thereagainst by said expansion force and by ram air pressure to define a continuous duct for directing ram air to said engine.

3. In an engine air ducting system for a jet propelled airplane having as components an engine air inlet duct, a jet engine, and a jet engine casing; a device for coupling a jet engine and air inlet ducting members comprising an annular flexible flange, generally U-shaped in cross section with substantially parallel sides extending inwardly, one sidewall being reinforced and being joined to the forward end of said jet engine casing, the other sidewall being terminated in a bead extending outwardly adjacent to and aligned with a flat annular contact surface on the facing end of said air inlet duct but sufficiently spaced therefrom to permit entry of outside air during an engine warm up period when the compressor of said engine creates a strong negative pressure inside said inlet duct yet, conversely, spaced sufficiently near to said air inlet duct contact surface that it is moved into firm contact therewith by thermal expansion of the engine as said engine becomes hot, and is held firmly thereagainst by said thermal expansion force and by ram air pressure in flight, thereby maintaining an airtight closure during all periods of hot engine operation.

4. A gas turbine engine comprising a compressor and having a compressor air inlet opening at one end of said engine, an air duct having an outlet opening opposed to and adjacent said compressor air inlet opening, means for supporting said engine to permit axial thermal expansion and contraction from said supporting means toward said inlet opening thereof to change the relative position of said compressor air inlet opening and said air duct outlet opening, said engine support being positioned with respect to said air duct outlet opening to provide a gap between said air duct outlet opening and said compressor air inlet opening when said engine is cold, said gap being closed by the thermal expansion of said engine when said engine is hot; and resilient material attached around one of said openings in a position adjacent the rim of the other of said openings but spaced therefrom by a portion of said gap, an edge of said material being movable toward said rim by said engine expansion to contact said rim when said engine is hot, said edge being maintained in substantially airtight contact with said rim by the force of ram air pressure acting against said material.

5. A gas turbine engine comprising a compressor and having a compressor air inlet opening at one end of said engine, an air duct having an outlet opening opposed to and adjacent said compressor air inlet opening, means for supporting said engine to permit axial thermal expansion and contraction from said supporting means toward said inlet opening thereof to change the relative position of said compressor air inlet opening and said air duct outlet opening, said engine support being positioned with respect to said air duct outlet opening to provide a gap between said air duct outlet opening and said compressor air inlet opening when said engine is cold, said gap being closed by the thermal expansion of said engine when said engine is hot; and resilient material positioned between said openings, being fastened around said openings in a position adjacent the rim of the other of said openings, said material being out of contact with said rim when said engine is cold, said material being movable under the urge of said engine expansion to move toward said rim to contact said rim when said engine is hot.

6. A gas turbine engine comprising a compressor and having a compressor air inlet opening at one end of said engine, an air duct having an outlet opening opposed to and adjacent said compressor air inlet opening, means for supporting said engine to permit axial thermal expansion and contraction from said supporting means toward said inlet opening thereof to change the relative position of said compressor air inlet opening and said air duct outlet opening, said engine support being positioned with respect to said air duct outlet opening to provide a gap between said air duct outlet opening and said compressor air inlet opening when said engine is cold, said gap being closed by the thermal expansion of said engine when said engine is hot; and a resilient material attached around one of said openings adjacent a rim around the other of said openings to partially close said gap when said engine is cold so that air can pass to said engine through said gap in the absence of ram air, said material being moved into contact with said rim by thermal expansion of said engine to completely close said gap to define a continuous duct to direct ram air to said engine.

References Cited in the file of this patent

UNITED STATES PATENTS

| Number | Name | Date |
| --- | --- | --- |
| 1,541,601 | Tribe | June 9, 1925 |
| 2,352,038 | Tolke | June 20, 1944 |
| 2,437,385 | Halford | Mar. 9, 1948 |
| 2,493,641 | Putz | Jan. 3, 1950 |
| 2,494,659 | Huyton | Jan. 17, 1950 |
| 2,564,042 | Walker | Aug. 14, 1951 |
| 2,587,345 | Lombard | Feb. 26, 1952 |

FOREIGN PATENTS

| Number | Country | Date |
| --- | --- | --- |
| 579,416 | Great Britain | Aug. 2, 1946 |
| 191,911 | Switzerland | Dec. 1, 1937 |